US005494726A

United States Patent [19]

Inomata

[11] Patent Number: 5,494,726

[45] Date of Patent: Feb. 27, 1996

[54] DECAL AND METHOD OF APPLICATION

[75] Inventor: Fumio Inomata, Dublin, Ohio

[73] Assignee: Honda Giken Kogyo Kabushiki Kaisha, Tokyo, Japan

[21] Appl. No.: 264,683

[22] Filed: Jun. 23, 1994

[51] Int. Cl.$^6$ .......... B32B 3/10

[52] U.S. Cl. .......... 428/131; 428/40; 428/43; 428/101; 428/136; 428/137; 428/138; 428/195; 428/211; 428/354; 428/914

[58] Field of Search .......... 160/236; 428/43, 428/79, 40, 914, 195, 211, 212, 131, 101, 136, 137, 138, 354

[56] References Cited

U.S. PATENT DOCUMENTS

| | | | |
|---|---|---|---|
| 3,797,147 | 3/1974 | Lemberg | 40/104.19 |
| 3,926,710 | 12/1975 | Weingrad et al. | 156/362 |
| 5,209,959 | 5/1993 | McNaul et al. | 428/40 |
| 5,227,209 | 7/1993 | Garland | 428/40 |
| 5,263,529 | 11/1993 | Landis | 160/236 |

FOREIGN PATENT DOCUMENTS 60-23133 2/1985 Japan .

*Primary Examiner*—Patrick J. Ryan
*Assistant Examiner*—William A. Krynski
*Attorney, Agent, or Firm*—Armstrong, Westerman, Hattori, McCleland & Naughton

[57] ABSTRACT

A decal assembly for applying a decal onto a surface includes a decal having an adhesive layer on a back side thereof and an opaque application tape layer positioned on a front side of the decal, opposite the back side, wherein the opaque application layer includes aligning elements for properly aligning the decal on the surface.

1 Claim, 3 Drawing Sheets

DECAL AND METHOD OF APPLICATION

BACKGROUND OF THE INVENTION

This invention is directed to a decal and method of application. More specifically, this invention is directed to a decal and method of application, in which an opaque application tape layer is used on the front surface of the decal and has means for properly aligning the decal for application.

DESCRIPTION OF THE RELATED ART

The application of decals to surfaces, and especially to surfaces on vehicles is well known. The proper application of decals, for example, to a surface such as a saddle tank used on an all terrain vehicle (ATV) or motorcycle is very important. The decal must be properly aligned in order to have the fight appearance on the vehicle.

Conventional decals are formed in a multi-layer package for application. Specifically, such decals are often sandwiched between an opaque backing layer and a transparent application layer. The opaque backing layer protects the adhesive backing on the decal. The transparent application tape layer protects the face of the decal during application of the decal onto the surface, and also allows the person applying the decal to see through the transparent application layer in order to properly align the decal onto the surface of the part to which it is applied. Once the decal is applied to the part and smoothed out, the transparent application tape layer is removed. A disadvantage of using a transparent application layer is that it is relatively expensive. Occasionally, a decal may be improperly positioned onto a part in a mass production environment. When this happens, the dislocated decal must be destroyed in order to be removed from the part. Thus, the relatively high cost of the transparent application layer is then wasted completely.

Another method for applying such a decal is known from Japan Kokai No. 60-23133. This method employs a jig which is configured to fit The decal is placed onto the jig and the jig is placed onto the part, such as a saddle tank of an ATV. The jig includes means for transferring the decal from the jig to the part, such as a vacuum type transfer apparatus. This method significantly reduces the improper location of the decal onto the part, when compared with the above-described manual application method. However, the jig method has a disadvantage in that the jig must be replaced or adjusted to fit different types of parts. Furthermore, the necessary vacuum transfer means increases the cost and complexity of this application process.

SUMMARY OF THE INVENTION

The instant invention avoids the disadvantages noted above by providing a decal, and a method of applying the decal, which is inexpensive and yet is a manual application so that it is easily adaptable to many different parts. Specifically, the decal of the instant invention has a front surface and a back surface. The front surface is a surface which will be facing outwardly when applied and will be seen by the consumer. The back surface of the decal is a surface on which an adhesive layer is applied. An opaque application tape layer is applied on the front surface of the decal, while an opaque backing layer is applied onto the adhesive layer in order to protect the adhesive layer before application. Furthermore, there are means for aligning the decal itself which are provided on the opaque application tape layer. For example, specific holes may be provided in the opaque application tape layer which line up with registration marks (or indicia) on the part itself. This allows proper placement of the decal on the part.

Many different types of aligning means may be employed. For example, a single hole may be provided in the opaque application tape layer which operates with a surface edge or paint strip edge to properly locate the decal on the part.

The use of an opaque application layer with aligning means provides an advantage over the conventional decal system in that the opaque application tape layer may be provided for a much lower cost, thus reducing the overall cost of production. Furthermore, even when a dislocated decal must be destroyed or removed, there is a corresponding reduction in the cost of the wastage.

The instant invention also provides an advantage over the jig system for installing a decal. Because the device of the instant invention is manually applied, the process is not so complex and may be easily adapted to applying the decal to different surfaces or parts.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

Figure 1:
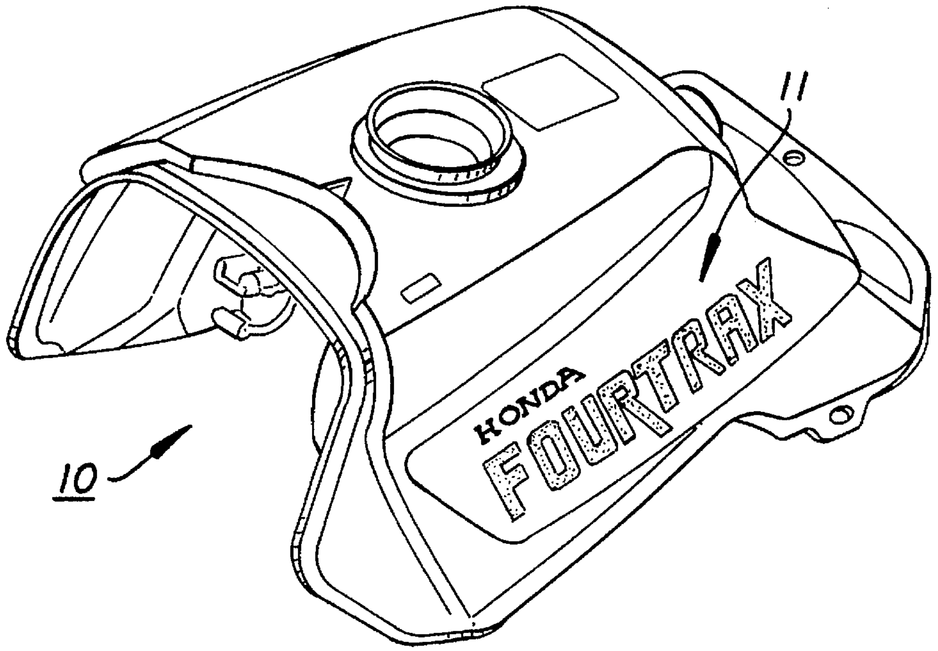
FIG. 1 is a perspective view of a fuel tank with the decal of the instant invention installed.

The decal of the instant invention can be applied to any kind of acceptable surface. Often, such decals are applied to vehicles or parts of vehicles. Specifically, as illustrated in FIG. 1 a fuel tank 10 from an All Terrain Vehicle (ATV) or even from a motorcycle has a decal 11 applied to a side surface thereof.

Figure 2:
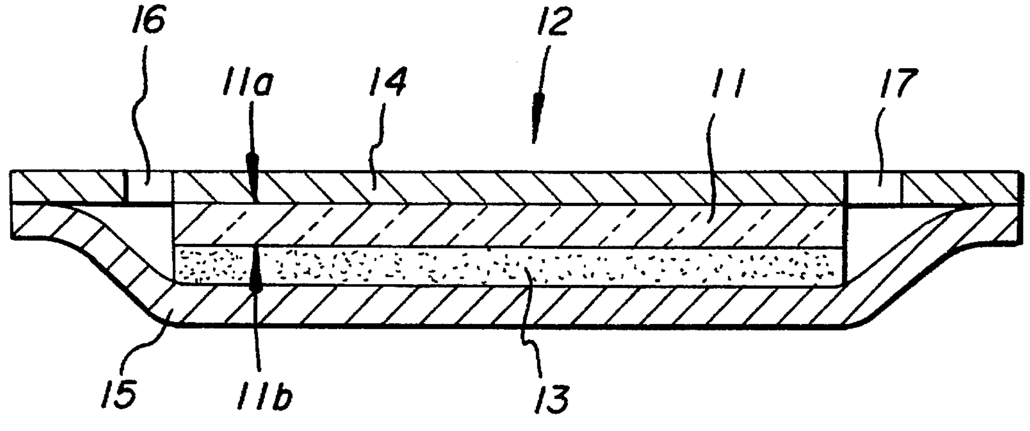
FIG. 2 is a cross sectional view of the decal assembly of the instant invention.

FIG. 2 is a cross section of decal assembly 12. The decal assembly 12 includes the decal 11 having a front surface **11*a* and a back surface 11*b*. The decal 11 has an adhesive layer 13 affixed on the back surface 11*b* of decal 11. When applied to a surface (such as the surface of fuel tank 10), adhesive layer 13 causes the decal 11 to adhere to the surface. An opaque backing layer 15 is applied to the adhesive layer 13 of decal 11 in order to protect the adhesive layer 13 before the decal 11 is applied. Furthermore, an opaque application tape layer 14 is provided on the front surface 11*a* of decal 11. The opaque application tape layer 14 also includes alignment holes 16 and 17** which are used for properly aligning the decal during application.

Figure 3:
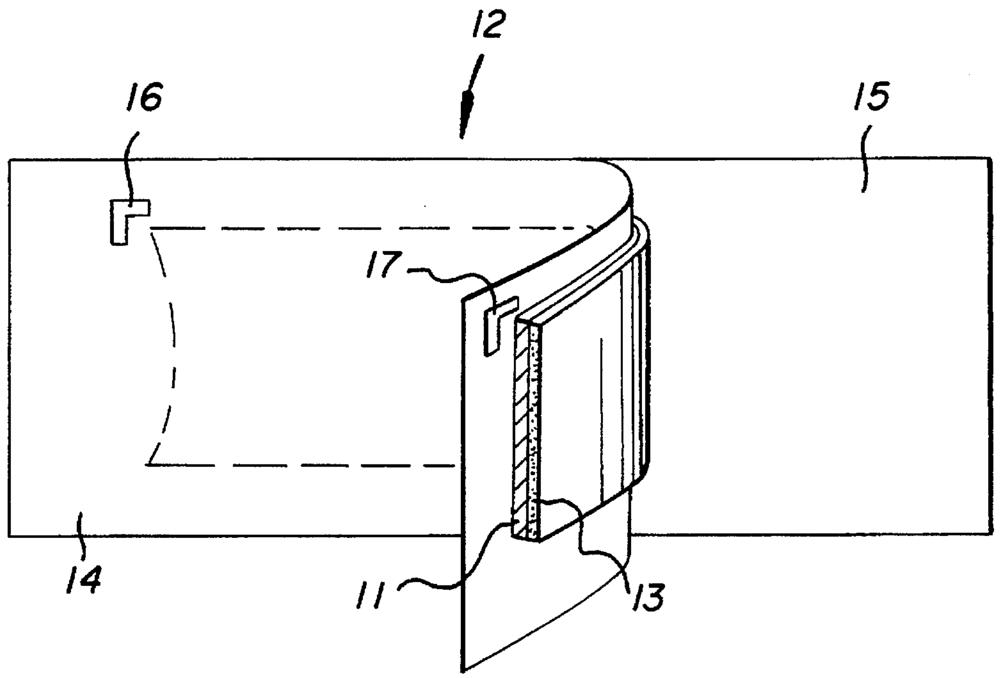
FIG. 3 is a front view of the decal assembly of the instant invention in which the opaque adhesive application tape layer is partially removed from the opaque backing layer.

FIG. 3 is a front view of the decal assembly 12 in which the opaque tape application layer 14 along with the decal 11 and adhesive layer 13 are partially pealed away from the opaque backing layer 15. As can be seen in FIG. 3, alignment hole 16 is in the shape of a comer cut out. Alignment hole 17 (seen from the backside) is also in the shape of a comer cut out. When the opaque backing layer 15 is peeled away from the opaque application tape layer 14, decal 11 and adhesive layer 13, the alignment holes 16 and 17 are fully exposed for the alignment process.

Figure 4:
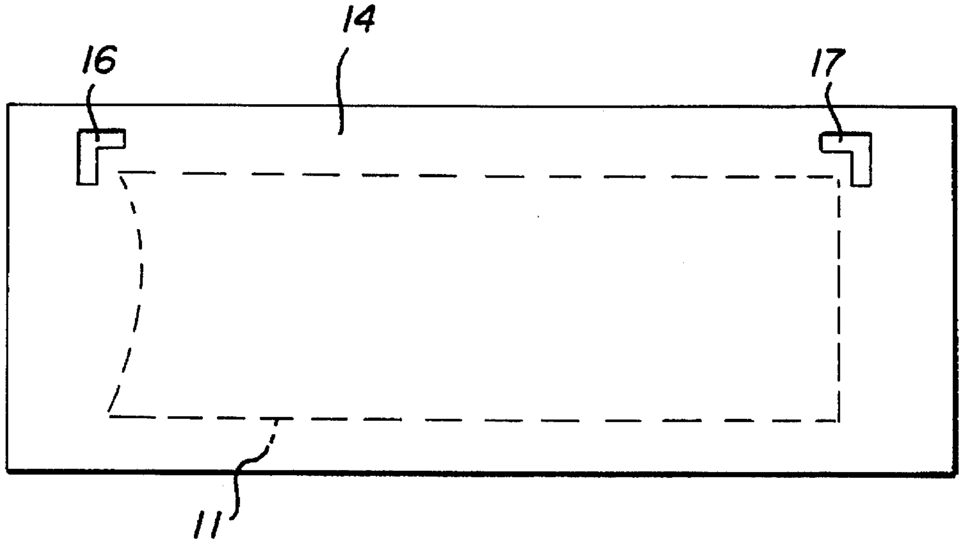
FIG. 4 is a front view of the opaque application tape layer with the decal and adhesive layer.

FIG. 4 is a front view of the opaque application tape layer 14 with the decal 11 shown in phantom, since it is behind the application tape layer 14. Alignment holes 16 and 17 are illustrated at the top left and top right portions, respectively, of the opaque application tape layer.

Figure 5:
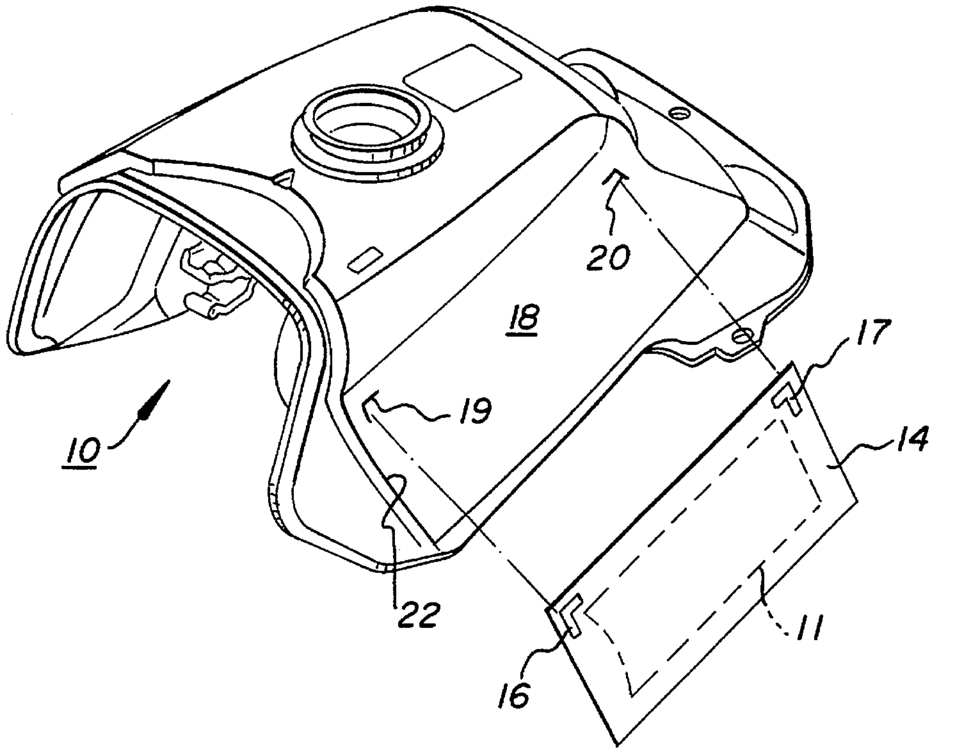
FIG. 5 is a perspective view of the fuel tank with the decal being applied.

The process for applying the decal 11 to the fuel tank 10 begins with peeling the opaque backing layer 15 (if used) from the opaque application tape layer 14, decal 11 and adhesive layer 13. FIG. 3 illustrates this step best. Next, the opaque application tape layer 14 with the decal and adhesive layer on the back of it, as shown in FIG. 5, is then aligned with indicia 19 and 20 found on the side surface 18 of the fuel tank 10. As the indicia 19 and 20 are lined up with alignment holes 16 and 17, respectively, the opaque application tape layer 14 is applied to the side surface 18 with the decal 11 and adhesive layer 13 facing the side surface 18 of the fuel tank 10. As the decal is applied to the side surface 18 of the fuel tank 10, the alignment of the alignment holes 16 and 17 with indicia 19 and 20 must be maintained. Then, the decal is smoothed to remove wrinkles and release air pockets trapped between the adhesive layer 13 and the side surface 18 of the fuel tank 10. Once the decal is completely smoothed down, the opaque application tape layer 14 is then removed to reveal the decal 11 fixed onto the side surface 18 and properly aligned.

Figure 6:
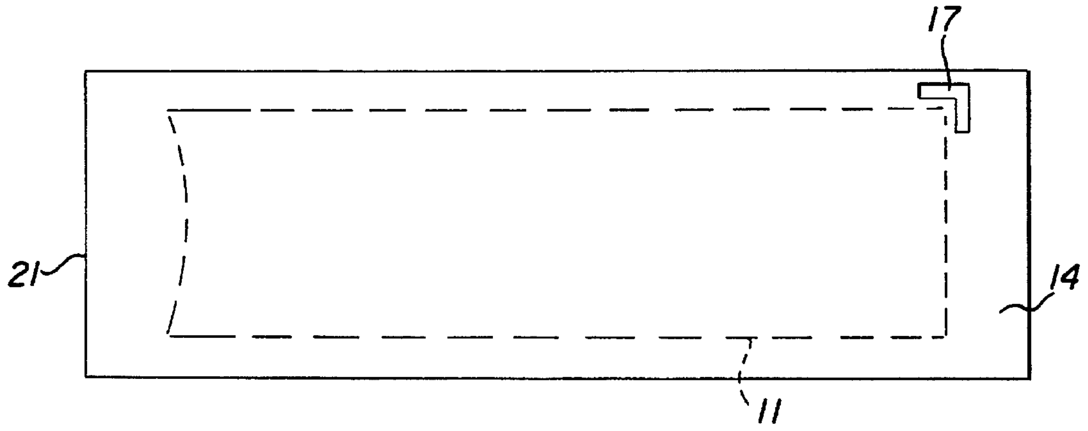
FIG. 6 is a front view of a second embodiment of the opaque application tape layer and decal.

FIG. 6 illustrates an alternative embodiment of the decal in which a single alignment hole 17 is provided on the opaque application tape layer 14. Furthermore, an edge 21 on the opaque application tape layer 14 is provided to cooperatively function with alignment hole 17 in the alignment of the decal during application. For example, on the fuel tank in FIG. 5, the alignment hole 17 is aligned with indicia 20. Edge 21 of opaque application tape layer 14 is aligned with surface edge 22 of the fuel tank 10. This also provides proper alignment of the decal. Edge 21 of the opaque application tape layer 14 may also be aligned with a paint strip edge.

The instant invention of the decal and method of applying it has been described above with regard to the application of the decal to a fuel tank of an ATV. Of course, this type of decal and method may also be applied to any surface on any type of a vehicle, whether an automobile, airplane or boat. In fact, the decal described above can be applied to any acceptable surface, including a glass or a wall.

It will be apparent to those skilled in the art that the embodiments described may be varied as discussed above and in other manners, such as to meet particular specialized requirements, without departing from the true spirit and scope of the invention as claimed.

I claim:

1. A decal assembly for applying a decal onto a surface, comprising:

a decal having an adhesive layer on a back side thereof; and an opaque application tape layer positioned on a front side of said decal, opposite said back side, wherein said opaque application tape layer includes aligning holes for properly aligning said decal on the surface, wherein said aligning holes includes two spaced apart holes in said opaque application tape layer.

* * * * *